United States Patent Office 3,522,281
Patented July 28, 1970

3,522,281
$\Delta^{3,5}$-7α-METHYLOESTRADIENES
Georg Anner, Basel, and Peter Wieland, Oberwil, Basel-Land, Switzerland, assignors to Ciba Corporation, New York, N.Y., a corporation of Delaware
No Drawing. Filed Oct. 23, 1967, Ser. No. 677,048
Claims priority, application Switzerland, Oct. 28, 1966, 15,712/66
Int. Cl. C07c 169/08
U.S. Cl. 260—397.5          9 Claims

ABSTRACT OF THE DISCLOSURE

Compounds of the formula

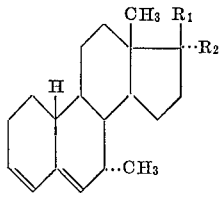

wherein
$R_1$ is a free, esterified or etherified hydroxyl group and
$R_2$ a hydrogen atom or a lower saturated or unsaturated unsubstituted or halogenated aliphatic hydrocarbon residue or
$R_1 + R_2$ represent an oxo group.

Use: antiovulating agents.

---

The present invention relates to the manufacture of new $\Delta^{3,5}$-7α-methyloestradienes of the formula (I)

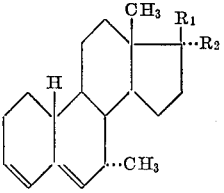

in which $R_1$ represents a free, esterified or etherified hydroxyl group and $R_2$ a hydrogen atom or a lower, saturated or unsaturated, unsubstituted or halogenated aliphatic hydrocarbon residue, or $R_1 + R_2$ represent an oxo group.

The afore-mentioned esterified hydroxyl group is above all derived from an organic carboxylic acid of the aliphatic, alicyclic, aromatic or heterocyclic series, especially from those which contain 1 to 15 carbon atoms, e.g. formic, acetic, propionic acid, butyric acids or valeric acids such as n-valeric acid, or from trimethylacetic acid, a caproic acid such as β-trimethylpropionic acid or diethylacetic acid, from oenanthic, caprylic, perlargonic, capric, undecyclic acids, for example undecylenic acid, or lauric, myristic, palmitic or stearic acids, e.g. the oleic acid, cyclopropane-, butane-, pentane- or hexane-carboxylic acid, cyclopropylmethanecarboxylic, cyclobutylmethanecarboxylic, cyclopentylethanecarboxylic, cyclohexylethanearboxylic acid, cyclopentyl-, cyclohexyl- or phenylacetic acids or propionic acids, benzoic acid, phenoxyalkane acids such as phenoxyacetic, para-chlorophenoxyacetic, 2,4-dichlorophenoxyacetic, 4-tertiary butylphenoxyacetic, 3-phenoxypropionic, 4-phenoxybutyric, furan-2-carboxylic, 5-tertiary butyl-furan - 2 - carboxylic, 5-bromo-furan-2-carboxylic acid, from nicotinic or isonicotinic acid. There is also suitable a lower aliphatic or monocyclic aromatic sulphonic acid such as methanesulphonic, ethanesulphonic, benzenesulphonic or para-toluenesulphonic acid, and also an inorganic acid such as sulphuric or especially phosphoric acid, for example orthophosphoric or metaphosphoric acid.

An etherified hydroxyl group is especially one derived from a lower aliphatic alkanol such as ethanol, methanol, propanol, isopropanol, a butanol or an amyl alcohol, or from araliphatic alcohols, especially from monocyclic lower aliphatic alcohols, such as benzyl alcohol, or from heterocyclic alcohols, especially from tetrahydropyranol. Enolether groups are likewise suitable.

The said saturated or unsaturated, unsubstituted or halogenated, lower aliphatic hydrocarbon residue contains preferably 1 to 4 carbon atoms and is, for example, an alkyl, alkenyl or alkinyl group, for instance the methyl, ethyl, propyl, vinyl, allyl, methallyl, ethinyl, propinyl, chloropropinyl, chlorethinyl, trifluoropropinyl or trichloropropinyl group.

The new compounds possess valuable pharmacological properties; inter alia they have an oestrogenic and anti-gonadotropic activity and in addition a strong antiovulating effect as can be shown by animal tests, for example on rats. The new compounds may therefore be used as preparations for controlling fertility. The new compounds are also valuable intermediates for the manufacture of other useful substances, especially of pharmacologically active products.

$\Delta^{3,5}$-7α-methyl - 17β - acetoxy - 17α - ethinyloestradiene, which for example in normal rats on oral administration of doses from 0.1 to 0.3 mg./kg. produces a pronounced antiovulating effect, should be mentioned especially.

The new compounds may also be used as additives to animal fodders.

The compounds of the present invention are accessible by known methods.

According to a preferred process for the manufacture of the new compounds of the above Formula I, in a compound of Formula I, in which $R_1$ and $R_2$ represent a free or protected oxo group, a protected oxo group is liberated in known manner, and/or a free oxo group reduced to a hydroxyl group, if desired or required with simultaneous introduction of a saturated or unsaturated, unsubstituted or halogenated, lower aliphatic hydrocarbon residue in position 17 and, optionally a hydroxyl group is esterified or etherified, or in a compound of the Formula I, in which $R_1$ is a free or esterified or etherified hydroxyl group, an esterified or etherified hydroxyl group is liberated in known manner, and/or, if desired a free hydroxyl group is esterified or etherified or is oxidized to an oxo group.

The 17-oxo group is reduced to a 17-hydroxyl group advantageously with a complex light metal hydride, such as sodium borohydride or lithium-aluminum hydride, in an ether such as tetrahydrofuran. If the said hydrocarbon residue is to be introduced simultaneously into 17-position, an organo-metal salt of the appropriate hydrocarbon is used, such as Grignard compound, for example methyl magnesium bromide or an alkali metal compound of an unsaturated aliphatic hydrocarbon such as acetylene sodium.

Esterification or etherification of a 17β-hydroxyl group follows the usual practice: The compound to be esterified is reacted with a reactive derivative of an acid, such as the halide or anhydride thereof, especially those of the acids mentioned above, in the presence of tertiary bases such as pyridine or quinoline, or with a reactive derivative of an alcohol, such as an alkylhalide or alkylsulphate, especially of one of the alcohols mentioned above, in the presence of a basic agent.

If desired, esterified or etherified hydroxyl groups are liberated in known manner in the present process. Ester groups are liberated by way of an alkaline hydrolysis or reduction, for example with a complex light-metal hydride such as lithium-aluminium hydride.

A protected oxo group in position 17 in the starting materials mentioned above is primarily a ketalized oxo group, especially the ethylenedioxy group. Such groups may likewise be hydrolyzed to the free oxo group by an acid treatment, for example with acetic acid of 90% strength.

The dehydration of a 17-hydroxyl group to the oxo group according to the present process may likewise be carried out in known manner, for example by the Oppenauer method or by treatment with a compound of hexavalent chromium, for example chromic acid, in pyridine or in an acid solution, especially in a sulphuric acid solution.

According to another as such known method for the manufacture of the new compounds of the above Formula I the residue $R_3$ in a compound of the formula (II)

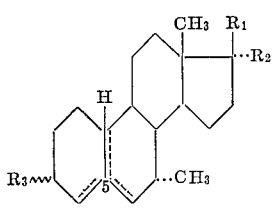

(in which $R_1$ and $R_2$ have the same meanings as in Formula I; $R_3$ represents a free or esterified hydroxy group) which contains a double bond starting from carbon atom 5, is liberated in the form of water or acid. When $R_3$ is a hydroxyl group, this reaction constitutes a dehydration and is achieved by treatment with an acid or alkaline reagent. Suitable acid reagents are, above all, lower aliphatic carboxylic acids, such as acetic, propionic acid or butyric acids, possibly in the presence of water, or acid anhydrides or acid halides, such as acetic anhydride or propionic anhydrides, the halides of inorganic acids such as the acids of sulphur or of phosphorus, for example phosphorus oxychloride, if desired in the presence of a tertiary base, such as pyridine or collidine, or sulphonic acids such as paratoluenesulphonic or methanesulphonic acid. There may also be used Lewis acids such as aluminium chloride or zinc chloride and weak inorganic acids such as silicic acid, for example in the form of silica gel. The dehydration may be performed in the presence or absence of solvents or diluents, for example of alcohols, such as methanol or ethanol, or ketones such as acetone or methylethylketone, or ethers such as dioxane or tetrahydrofuran.

The dehydration may also be performed with alkaline reagents, for instance with alkali metal hydroxides, for example ethyl- or ethanolic potassium hydroxide, alkali or alkaline earth metal alcoholates or alumina. When $R_3$ represents an esterified hydroxyl group, the reaction according to this invention consists in an elimination of acid. Particularly suitable esters are lower aliphatic carboxylic acid esters such as acetates or propionates, or sulphonic acid esters such as paratoluenesulphonates or mesylates. The acid is eliminated by treatment with an acid or alkaline reagents, or pyrolytically, preferably in a suitable neutral solvent. Thus, for example, a 3-tosylate corresponding to the formula shown may be converted by heating at an elevated temperature in dimethyl sulphoxide into a compound according to the present invention. A 3-acetate, for example, can be converted into the $\Delta^{3,5}$-diene by heating with paratoluene-sulphonic acid or with a lithium halide in the presence of lithium carbonate, for example in dimethylformamide. Suitable alkaline reagents are, for example, salts of weak organic acids, for example sodium acetate, in acetone or dimethylformamide.

An ester residue can also be eliminated readily from a 3-carbonate or 3-thiocarbonate, especially from an xanthate. Thus, carbalkoxylated 3-hydroxy compounds of the formula (IV)

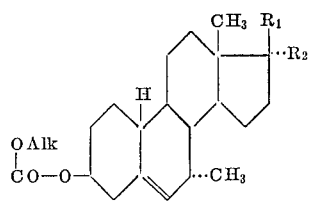

and xanthates of the formula (V)

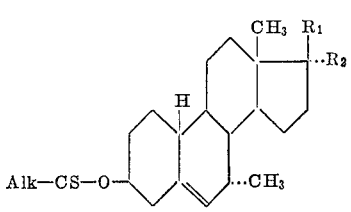

in which Alk stands for an alkyl group—can be converted into the desired $\Delta^{3,5}$-steroid-dienes by heating under vacuum.

According to another method for the manufacture of the new compounds a 3-thioenolether of the formula (VI)

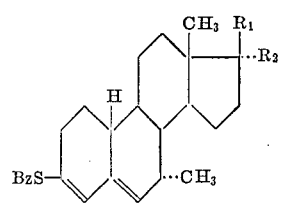

in which $R_1$ and $R_2$ have the above meanings and Bz represents a benzyl radical—is treated with Raney nickel in a solvent such as acetone.

It is also possible to start from compounds, which under the reaction conditions of the elimination of water or acid form in position 3 a double bond starting from carbon atom 5, for example a compound of the formula (VII)

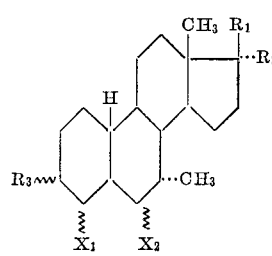

in which $R_1$ to $R_2$ have the above meanings and $X_1$ or $X_2$ represents a free or esterified hydroxyl group or a hydrogen atom, with the proviso that at most one of the groups $X_1$ and $X_2$ represents a free or esterified hydroxyl group. This variant may also be carried out stepwise; for example at first the group $R_3$ and then the group $X_1$ or $X_2$ is eliminated.

According to another method for the manufacture of the $\Delta^{3,5}$-dienes of this invention the residue $R_3$ in a compound of the formula (VIII)

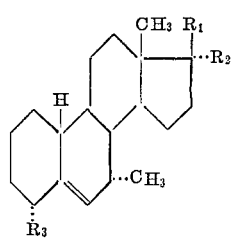

(where $R_1$ to $R_3$ have the above meanings) is eliminated in known manner in the form of water or acid. It is also possible to start from compounds that under the reaction conditions give rise to the starting-materials of the Formula VIII.

Finally, the products of the above Formula I are accessible from compounds of the formula (IX)
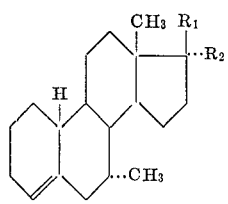

by halogenation, especially bromination, in known manner and subsequent, likewise known dehydrobromination. The halogenation, for example bromination, is advantageously carried out by treatment with elemental bromine, for example in a hydrocarbon or in a chlorinated hydrocarbon, such as methylenechloride, chloroform or tetrahydrofuran as solvent. The dehydrobromination may be performed with an alkaline agent such as a tertiary organic base, for example pyridine or collidine, or with a lithium halide or lithium carbonate in dimethylformamide.

The above-mentioned starting steroids of the Formula II to IX are known or can be prepared by known methods. Particularly valuable process products are $\Delta^{3,5}$-$7\alpha$-methyl-$17\beta$-hydroxyoestradiene and its esters, especially its lower aliphatic carboxylic acid esters, for example the 17-acetate, and its ethers, especially those mentioned above, for example the tetrahydropyranyl ether, the $\Delta^{3,5}$-$7\alpha$-methyl-17-oxo-oestradiene, $\Delta^{3,5}$-$7\alpha,17\alpha$-dimethyl-$17\beta$-hydroxyoestradiene and $\Delta^{3,5}$-$7\alpha$-methyl-$17\alpha$-ethinyl-$17\beta$-hydroxyoestradiene and their esters and ethers, for example those mentioned above.

The invention includes also any variant of the process in which an intermediate obtained at any stage of the process is used as starting material and any remaining step/steps is/are carried out or in which the starting materials are formed in situ.

The present invention includes also the manufacture of pharmaceutical preparations for use in human or veterinary medicine that contain the new $\Delta^{3,5}$-$7\alpha$-methyloestradienes of the Formula I as active ingredient. As excipients organic or inorganic substances are used that are suitable for enteral, for example oral, parenteral or local administration. Suitable excipients are substances that do not react with the new compounds, for example water, gelatin, lactose, starches, magnesium stearate, talcum, vegetable oils, benzyl alcohols, gums, polyalkyleneglycols, white petroleum jelly, chloesterol or other known medicinal excipients. The pharmaceutical preparations may be in solid form, for example tablets, dragees or capsules, or in liquid or semiliquid form solutions, suspensions, emulsions, ointments or creams. These pharmaceutical preparations may be sterilized and/or contain auxiliaries such as preserving, stabilizing, wetting or emulsifying agents, salts for regulating the osmotic pressure, or buffers. They may also contain further therapeutically valuable substances. The new compounds may also be used as starting materials for the manufacture of other valuable substances.

The following examples illustrate the invention.

EXAMPLE 1

A mixture of 9.65 g. of $\Delta^4$-3-hydroxy-$7\alpha$-methyl-$17\alpha$-ethinyl-$17\beta$-acetoxyoestrene, 193 ml. of glacial acetic acid and 193 ml. of water is stirred for 30 minutes under nitrogen at an external temperature of 100° C., then concentrated under vacuum and diluted with water, agitated with methylenechloride, washed with saturated sodium bicarbonate solution and water, dried and evaporated under vacuum. The residue is dissolved in toluene and filtered through 300 g. of alumina (activity II) and rinsed with 1.2 litres of toluene. The filtrate is evaporated under vacuum and the residue crystallized from methanol, to yield 4.63 g. of $\Delta^{3,5}$-$7\alpha$-methyl-$17\alpha$-ethinyl-$17\beta$-acetoxyoestradiene. After recrystallization from methanol it melts at 131.5 to 133.5° C. Ultraviolet spectrum in absolute alcohol: $\epsilon_{229\,m\mu}=20,000$; $\epsilon_{237\,m\mu}=21,400$;

$$\epsilon_{244\,m\mu}=13,500$$

EXAMPLE 2

A mixture of 200 ml. of glacial acetic acid and 200 ml. of water is heated to 100° C., mixed with 10 g. of $\Delta^4$-$3\beta,17\beta$-diacetoxy-$7\alpha$-methyl-$17\alpha$-ethinyloestrene, and the whole is stirred for 15 minutes at 100° C. under nitrogen, then cooled with an ice+methanol mixture, suction-filtered and washed with water. The suction filter cake is dissolved in methylenechloride, washed with sodium bicarbonate solution and water, dried and evaporated under vacuum. Crystallization of the residue from methanol furnishes 6.53 g. of the $\Delta^{3,5}$-$7\alpha$-methyl-$17\alpha$-ethinyl-$17\beta$-acetoxyoestradiene described in Example 1.

EXAMPLE 3

A mixture of 10 g. of crude $\Delta^4$-3,$17\beta$-dihydroxy-$7\alpha$-methyl-$17\alpha$-ethinyloestrene with 200 ml. of glacial acetic acid and 200 ml. of water is stirred for 30 minutes under nitrogen at a bath temperature of 100° C., then evaporated under vacuum and the residue dissolved in methylenechloride, washed with saturated sodium bicarbonate solution and water, dried and evaporated under vacuum. The residue is chromatographed on 300 g. of alumina (activity II). The fractions eluted with 4 litres of toluene contain the $\Delta^{3,5}$-$7\alpha$-methyl-$17\alpha$-ethinyl-$17\beta$-hydroxyoestradiene. For crystallization it is dissolved in pentane, mixed with 1 ml. of water and stirred with cooling, to yield 6.49 g. of colourless crystals melting at 57 to 68° C.

EXAMPLE 4

A mixture of 6.9 g. of crude $\Delta^4$-3,$17\beta$-dihydroxy-$7\alpha,17\alpha$-dimethyloestrene, 140 ml. of glacial acetic acid and 140 ml. of water is stirred for 30 minutes at an external temperature of 100° C., then evaporated under vacuum; the residue is dissolved in methylenechloride and the organic solution is washed with saturated sodium bicarbonate solution and water, dried and evaporated under vacuum. The crude product is purified by chromatography on 180 g. of alumina (activity II). When the crystalline fractions eluted with toluene are recrystallized from pentane, they yield 4.43 g. of $\Delta^{3,5}$-$7\alpha,17\alpha$-dimethyl-$17\beta$-hydroxyoestradiene melting at 102.5 to 104° C.

EXAMPLE 5

3.4 grams of the $\Delta^{3,5}$-$7\alpha,17\alpha$-dimethyl-$17\beta$-hydroxyoestradiene obtained in Example 4, together with a mixture of 50 ml. of pyridine and 50 ml. of acetic anhydride, are refluxed for 4 hours under nitrogen; the batch is then evaporated under vacuum, and the residue is dissolved in xylene and once more evaporated under vacuum. The residue is chromatographed on 110 g. of alumina (activity II). The fractions eluted with petroleum ether and a 4:1-mixture of petroleum ether and toluene are found to be unitary in the thin-layer chromatogram on silica gel; they are combined and yield 3.67 g. of $\Delta^{3,5}$-$7\alpha,17\alpha$-dimethyl-$17\beta$-acetoxy-$\Delta^{3,5}$-oestradiene in the form of a colourless oil.

EXAMPLE 6

12.5 grams of $7\alpha$-methyl-19-nortestosterone are stirred with ice cooling into a mixture of 15 g. of lithium tri-tertiary butoxy-aluminium hydride and 150 ml. of tetrahydrofuran, and flushing is performed with 30 ml. of tetrahydrofuran. After stirring for 16 hours at room temperature, while cooling with ice, 150 ml. of saturated Seignette salt solution and then 6 ml. of glacial acetic acid are added. The batch is then extracted with methylenechloride, washed with water, dried and evaporated under vacuum. The resulting crude $\Delta^4$-3,$17\beta$-dihydroxy-$7\alpha$-methyloestrene is stirred for half an hour with a mixture of 260 ml. of acetic acid and 260 ml. of water at a bath temperature of 100° C., then evaporated under vacuum, mixed with 400 ml. of saturated sodium bicarbonate solution, and extracted with methylenechloride. The organic solutions are washed with water, dried and evaporated under vacuum, and the residue is chromatographed on 375 g. of alumina (activity II). The fractions eluted with a 1:1-mixture of petroleum ether and toluene and with toluene alone yield on crystallization from pentane 8.64 g. of $\Delta^{3,5}$-7α-methyl-17β-hydroxyoestradiene which after recrystallization melts at 98 to 100° C.

EXAMPLE 7

A mixture of 300 mg. of $\Delta^{3,5}$-7α-methyl-17β-hydroxyoestradiene, 5 ml. of pyridine and 5 ml. of acetic anhydride is kept for 19 hours at room temperature, then evaporated under vacuum at 30° C., mixed with water and extracted with methylenechloride. The organic solutions are washed with sodium bicarbonate solution and water, dried and evaporated under vacuum and the residue is filtered in toluene solution through 3 g. of alumina, flushing being performed with 250 ml. of toluene. Evaporation of the filtrate under vacuum and crystallization of the residue from methanol furnishes 200 mg. of $\Delta^{3,5}$-7α-methyl-17β-acetoxyoestradiene which on recrystallization melts at 85 to 87° C.

EXAMPLE 8

A solution of 3.63 g. of $\Delta^{3,5}$-7α-methyl-17β-hydroxy-$\Delta^{3,5}$-oestradiene in 4.9 ml. of benzene and 2.18 ml. of dihydropyran is mixed with 36.3 ml. of a 0.1% solution of paratoluenesulphonic acid in benzene. The batch is stirred for 45 minutes at room temperature, diluted with methylenechloride, washed with dilute sodium bicarbonate solution and water, dried and evaporated under vacuum. The residue is chromatographed on 180 g. of Florisil, using fractions of 300 ml. of toluene each. Fractions 2 to 6 are combined and dried at 40° C. under a high vacuum, to yield 4.1 g. of $\Delta^{3,5}$-7α-methyl-17β-tetrahydropyranyloxyoestradiene in the form of a colourless oil.

EXAMPLE 9

While stirring a solution of 1.28 g. of $\Delta^{3,5}$-7α-methyl-17β-hydroxyoestradiene in 39 ml. of acetone and cooling it with an ice+methanol mixture, 1.6 ml. of 8 N-chromium trioxide solution in dilute sulphuric acid are added dropwise. 10 minutes later the whole is poured into water and extracted with ether. The ethereal solutions are washed with dilute sodium bicarbonate solution and water, dried and with the addition of methylenechloride evaporated under vacuum. The residue is filtered in toluene solution through 12 g. of alumina (activity II), flushing being carried out with 200 ml. of toluene. The filtrate is evaporated under vacuum and the residue repeatedly recrystallized from pentane. The resulting $\Delta^{3,5}$-7α-methyl-17-oxo-oestradiene melts at 148 to 152° C.

When it is reacted with methyl magnesium bromide, it yields the $\Delta^{3,5}$-7α,17α-dimethyl-17β-hydroxyoestradiene described in Example 4.

When $\Delta^{3,5}$-7α-methyl-17-oxo-oestradiene is reacted with potassium acetylide and acetylene in liquid ammonia, it yields the $\Delta^{3,5}$-7α-methyl-17α-ethinyl-17β-hydroxyoestradiene described in Example 3.

We claim:
1. Compounds of the formula

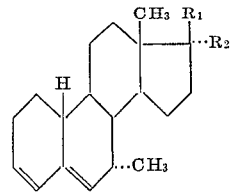

in which $R_1$ represents a free, esterified or etherified hydroxyl group and $R_2$ stands for a hydrogen atom or a lower saturated or unsaturated, unsubstituted or halogenated hydrocarbon residue.

2. Compounds of the formula given in claim 1, wherein $R_1$ is a hydroxyl group and $R_2$ an alkyl group having 1 to 3 carbon atoms.

3. Compounds as claimed in claim 2, wherein $R_2$ is a methyl group.

4. Compounds of the formula given in claim 1, wherein $R_1$ is a hydroxy group and $R_2$ an alkenyl group having from 2 to 4 carbon atoms.

5. Compounds as claimed in claim 4, wherein $R_2$ is allyl alkyl.

6. Compounds of the formula given in claim 1, wherein $R_1$ is a hydroxyl group and $R_2$ is an alkinyl group having from 2 to 4 carbon atoms.

7. Compounds as claimed in claim 6, wherein $R_2$ is the ethinyl group.

8. Compounds of the formula given in claim 1, wherein $R_1$ is a hydroxyl group esterified with an aliphatic, aromatic or heterocyclic carboxylic acid having 1 to 15 carbon atoms and $R_2$ is hydrogen.

9. Compounds of the formula given in claim 1, wherein $R_1$ is a hydroxyl group and $R_2$ is hydrogen.

References Cited

FOREIGN PATENTS 624,988    8/1961    Canada.

OTHER REFERENCES

Campbell et al.: Steroids, vol. 1, March 1963, pp. 317–324.

LEWIS GOTTS, Primary Examiner

E. G. LOVE, Assistant Examiner

U.S. Cl. X.R.

260—239.5, 239.55, 397.3, 397.4; 424—238, 242

PO-1050
(5/69)

UNITED STATES PATENT OFFICE
CERTIFICATE OF CORRECTION

Patent No. 3,522,281          Dated July 28, 1970

Inventor(s) GEORG ANNER ET AL

It is certified that error appears in the above-identified patent and that said Letters Patent are hereby corrected as shown below:

Column 8, line 29, after "allyl" delete "alkyl".

Signed and sealed this 6th day of July 1971.

(SEAL)
Attest:

EDWARD M. FLETCHER, JR.
Attesting Officer

WILLIAM E. SCHUYLER, JR.
Commissioner of Patents